United States Patent
Chang et al.

(10) Patent No.: US 11,099,058 B2
(45) Date of Patent: Aug. 24, 2021

(54) ELECTRONIC SCALE WITH CALIBRATION FUNCTION AND ELECTRONIC SCALE CALIBRATING METHOD

(71) Applicant: Primax Electronics Ltd., Taipei (TW)

(72) Inventors: Pei-Ming Chang, Taipei (TW); Wen-Chih Shen, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 116 days.

(21) Appl. No.: 16/394,546

(22) Filed: Apr. 25, 2019

(65) Prior Publication Data

US 2020/0217710 A1   Jul. 9, 2020

(30) Foreign Application Priority Data

Jan. 4, 2019   (TW) ................................. 108100415

(51) Int. Cl.
*G01G 23/01*   (2006.01)

(52) U.S. Cl.
CPC .................................. *G01G 23/012* (2013.01)

(58) Field of Classification Search
CPC .... G01G 23/01; G01G 19/393; G01G 23/012; G01G 23/3707; G01G 17/00; G01G 17/08; G01G 19/005; G01G 19/18; G01G 9/00; G01L 25/00
USPC ....... 73/1.13, 1.15, 1.88; 177/25.13; 702/88, 702/101
See application file for complete search history.

(56) References Cited

U.S. PATENT DOCUMENTS

| | | | | |
|---|---|---|---|---|
| 4,738,324 A | * | 4/1988 | Borchard | G01G 3/08 177/210 C |
| 5,058,422 A | * | 10/1991 | Shimauchi | G01G 23/012 73/1.13 |
| 8,387,437 B2 | * | 3/2013 | Yamazaki | G01G 23/01 73/1.13 |
| 9,354,108 B2 | * | 5/2016 | Iizuka | G01G 23/012 |
| 2011/0077899 A1 | * | 3/2011 | Hayashi | A63F 13/428 702/142 |
| 2014/0150519 A1 | * | 6/2014 | Iizuka | G01G 23/01 73/1.13 |

* cited by examiner

*Primary Examiner* — Nimeshkumar D Patel
*Assistant Examiner* — Gedeon M Kidanu
(74) *Attorney, Agent, or Firm* — Kirton McConkie; Evan R. Witt

(57) ABSTRACT

An electronic scale calibrating method for an electronic scale is provided. The electronic scale includes a weighing pan, a memory unit, a first weight sensor and a second weight sensor. The weighing pan has a placement region. The first weight sensor and the second weight sensor are symmetric with respect to the placement region. Firstly, two standard samples are placed in the placement region simultaneously. Then, the first weight sensor and the second weight sensor sense the two standard samples to obtain a first read value and a second read value, respectively. Then, a first parameter, a second parameter, a first calibration coefficient and a second calibration coefficient are defined according to the first read value and the second read value. Then, a calibration formula is generated and stored in the memory unit.

10 Claims, 3 Drawing Sheets

ELECTRONIC SCALE WITH CALIBRATION FUNCTION AND ELECTRONIC SCALE CALIBRATING METHOD

FIELD OF THE INVENTION

The present invention relates to an electronic scale with a calibration function and an electronic scale calibrating method, and more particularly to an electronic scale with a calibration function and an electronic scale calibrating method in order to calibrate the electronic scale in a time-saving and labor-saving manner.

BACKGROUND OF THE INVENTION

An electronic scale is a kind of electronic device for measuring the weight value through an electronic weight sensor. During the operation of the electronic scale, the weight value of the object to be weighed is converted into an analog signal (e.g., a voltage signal or a current signal). After the analog signal is filtered and amplified, the analog signal is converted into a digital signal. In addition, the measurement result in a digital number is shown on a display screen. Due to the simple operation and accurate measurement, electronic scales have been widely used in various fields such as markets, supermarkets, pharmacies, silver buildings, post offices, laboratories. In other words, electronic scales are indispensable electronic products for the modern life.

FIG. 1 schematically illustrates the appearance of a conventional electronic scale. The electronic scale 100 comprises a weighing pan 11 and a main body 10. The weighing pan 11 is installed on the main body 10. When an object to be weighed (not shown) is placed on the weighing pan 11, the weight value of the object can be measured. The main body 10 further comprises an operation interface 12 and a display interface 13. The operation interface 12 can be operated by the user. The measurement result can be shown on the display interface 13. Moreover, a specific number of weight sensors (not shown) are disposed in the main body 10 for sensing the weight value of the object.

According to the conventional structure of the electronic scale, a support frame assembly (not shown) is used to support a bottom side of the weighing pan 11. The pressing force of the object applied to the weighing pan 11 can be transferred to the weight sensor through the support frame assembly. Consequently, the weight value of the object can be detected by the weight sensor. In other words, except for the sensitivity and the specification of the weight sensor, the structural relationships between the weighing pan 11, the support frame assembly and the weighting sensor are important factors influencing the measuring accuracy.

If the electronic scale has only a single weight sensor, the site of the weight sensor is located at the center of the weighing pan 11. If the electronic scale has two or more weight sensors, the sites of the weight sensors are symmetrically distributed with respect to the weighing pan 11. Generally, the weight value of the object is measured by placing the object on the center of the weighing pan 11. Since the weight on the weighing pan 11 is uniformly distributed, the weighing pan 11 is not inclined and the measurement result is not adversely affected. As known, the other sites of the weighing pan 11 are possibly the effective sites for placing and measuring the object.

However, if the electronic scale is operated incorrectly, the electronic scale is possibly suffered from mechanical damage or the performance of the related components is deteriorated. Under this circumstance, the measuring accuracy is reduced. For continuously operating the electronic scale, it is necessary to calibrate the electronic scale. In case that the tolerance of measurement is very low (e.g., lower than several grams or several milligrams), the calibration is more important.

According to a conventional calibrating method, a placement region 110 of the weighing pan 11 is divided into a specified number (e.g., 9) of regions or sites. Then, a standard weight is placed on these regions or sites sequentially and the measurement results are read successively. That is, the read values of the same standard weight in different regions or sites are obtained. Generally, the weight value of the standard weight is known. If the electronic scale is aslant or the measurement accuracy of the electronic scale is impaired, the read values of the standard weight corresponding to different regions or positions of the electric scale are possibly different. According to the result of comparing the read values at various regions or positions with the known accurate weight value, the weighting measurements can be adjusted linearly.

For example, if the read values corresponding to some regions or positions are higher, the read values need to be decreased. Whereas, if the read values corresponding to some regions or positions are lower, the read values need to be increased. Then, according to the adjustment experience, a calibration formula is obtained and stored into the electronic scale. From now on, each measurement result of the electronic scale can be calibrated. That is, after the measurement result is inputted into the calibration formula, the calibrated measurement result is transmitted to and shown on the display interface and used as the final result. Similarly, some other standard weights with different weight values are successively placed on different sites or regions of the weighing pan 11, and the above calibrating process is repeatedly done. Consequently, the calibration can be further verified.

However, since the conventional calibrating method is complicated, inefficient and lengthy, it is not cost-effective. Moreover, the accuracy of the calibration result is not always accepted by the production factory.

For overcoming the above drawbacks, there is a need of providing an electronic scale with enhanced convenience in calibration and application.

SUMMARY OF THE INVENTION

The present invention provides an electronic scale with a calibration function and an electronic scale calibrating method. According to the calibrating method of the present invention, two standard samples with the same weight value are simultaneously placed on the weighing pan, and the two standard samples are sensed by two weight sensors. Since the computing process is simplified, the electronic scale calibrating method of the present invention is time-saving and labor-saving.

In accordance with an aspect of the present invention, there is provided an electronic scale calibrating method for an electronic scale. The electronic scale includes a weighing pan, a memory unit, a first weight sensor and a second weight sensor. The weighing pan has a placement region. The first weight sensor and the second weight sensor are symmetric with respect to the placement region. The electronic scale calibrating method includes the following steps. Firstly, two standard samples are placed in the placement region simultaneously, wherein the two standard samples have the same reference weight value. Then, the two standard samples are sensed by the first weight sensor and the second weight sensor. The first weight sensor senses the two standard samples to obtain a first read value. The second weight sensor senses the two standard samples to obtain a second read value. Then, the first read value is divided by the reference weight value so as to define a first parameter, the second read value is divided by the reference weight value so as to define a second parameter, a reciprocal of the first parameter is defined as a first calibration coefficient, and a reciprocal of the second parameter is defined as a second calibration coefficient. Then, a calibration formula is generated according to the first calibration coefficient and the second calibration coefficient, and the calibration formula is stored in the memory unit. The product of a third read value and the first calibration coefficient plus the product of a fourth read value and the second calibration coefficient is equal to the calibration formula. When an object to be weight is placed on the weighing pan, the first weight sensor senses the object to obtain the third read value and the second weight sensor senses the object to obtain the fourth read value.

In accordance with another aspect of the present invention, there is provided an electronic scale with a calibration function. The electronic scale includes a weighing pan, a first weight sensor, a second weight sensor, a processing unit and a memory unit. The weighing pan has a placement region. Moreover, two standard samples having the same reference weight value are placed in the placement region. The first weight sensor senses the two standard samples to obtain a first read value. The second weight sensor senses the two standard samples to obtain a second read value. The first weight sensor and the second weight sensor are symmetrically arranged in the placement region. The processing unit is used for dividing the first read value by the reference weight value to define a first parameter, dividing the second read value by the reference weight value to define a second parameter, defining a reciprocal of the first parameter as a first calibration coefficient, defining a reciprocal of the second parameter as a second calibration coefficient and generating a calibration formula according to the first calibration coefficient and the second calibration coefficient. The calibration formula is stored in the memory unit. The product of a third read value and the first calibration coefficient plus the product of a fourth read value and the second calibration coefficient is equal to the calibration formula. When an object to be weight is placed on the weighing pan, the first weight sensor senses the object to obtain the third read value and the second weight sensor senses the object to obtain the fourth read value The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

Figure 2:
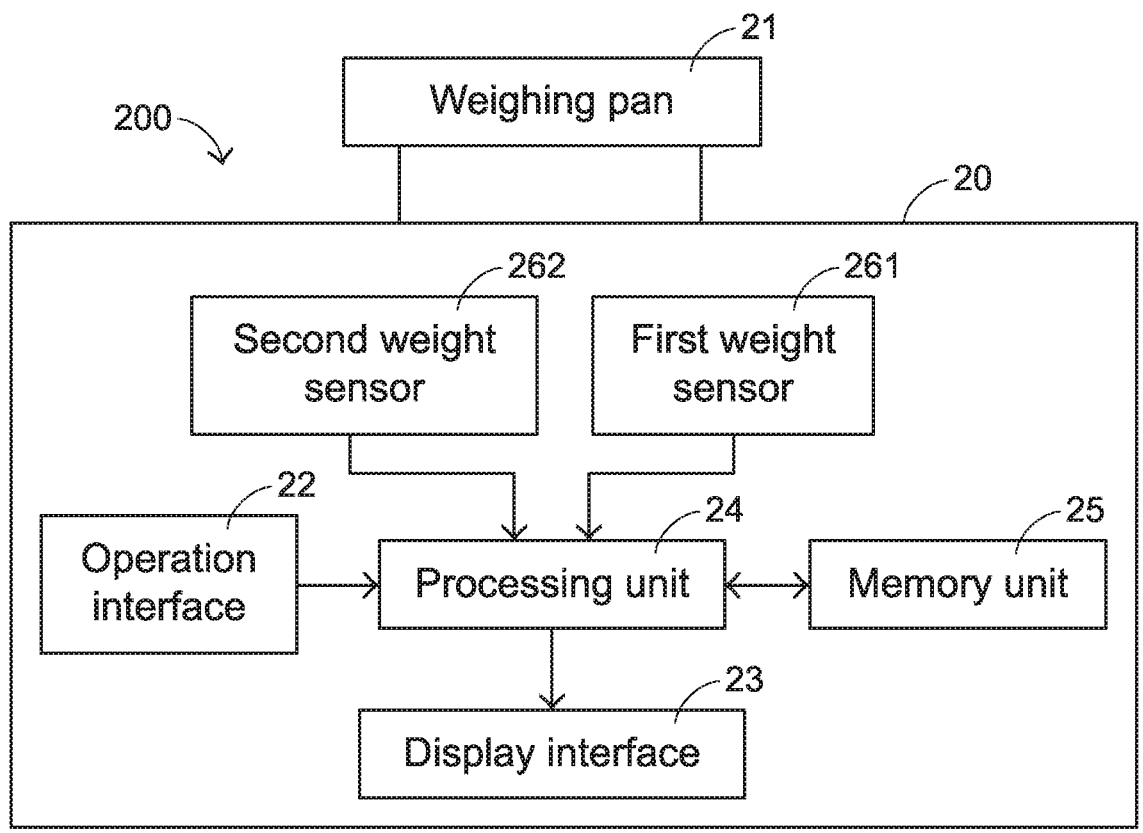
FIG. 2 is a schematic functional block diagram illustrating the architecture of an electronic scale according to an embodiment of the present invention.

The present invention provides an electronic scale with a calibration function and an electronic scale calibrating method for the electronic scale. FIG. 2 is a schematic functional block diagram illustrating the architecture of an electronic scale according to an embodiment of the present invention. As shown in FIG. 2, the electronic scale 200 comprises a weighing pan 21, a processing unit 24, a memory unit 25, a first weight sensor 261, a second weight sensor 262, an operation interface 22, and a display interface 23 are included in the electronic scale 200. The connecting relationships between these components are also shown in FIG. 2.

Figure 1:
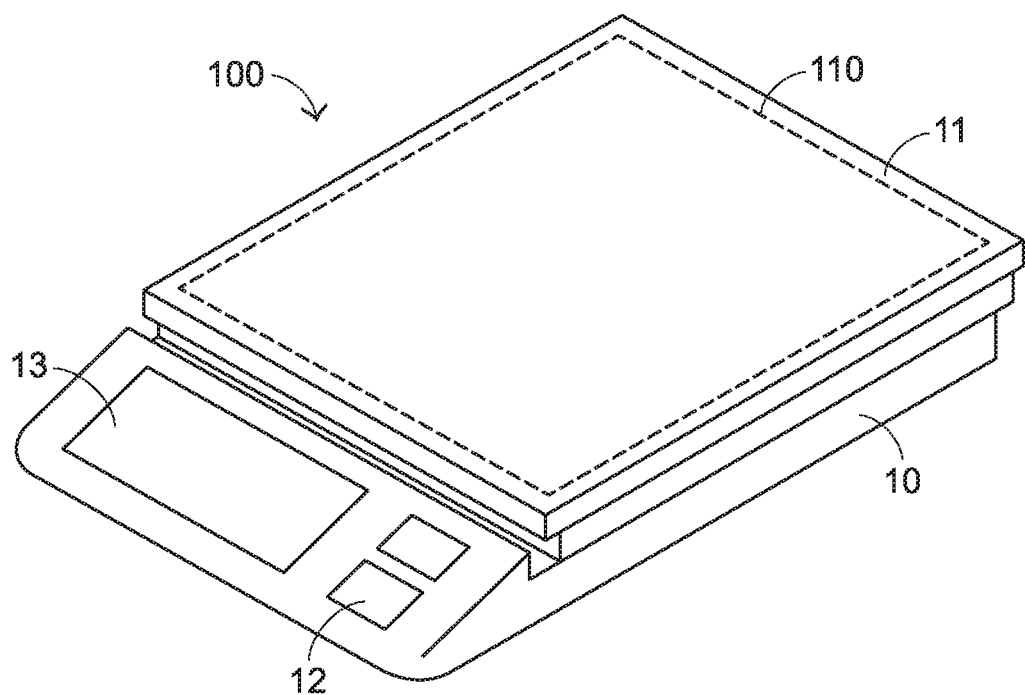
FIG. 1 schematically illustrates the appearance of a conventional electronic scale.

It is noted that the hardware design of the electronic scale 200 is similar to the hardware design of the conventional electronic scale. That is, the appearance and the related components of the electronic scale 200 are similar to those of the electronic scale 100 as shown in FIG. 1. The electronic scale 200 further comprises a main body 20. The processing unit 24, the memory unit 25, the first weight sensor 261 and the second weight sensor 262 are disposed within the main body 20. The weighing pan 21, the operation interface 22 and the display interface 23 are installed on the main body 20 or exposed outside the main body 20. The objected to be weighed is placed on the weighing pan 21. The operation interface 22 can be operated by the user. The measurement result can be shown on the display interface 23.

The pressing force of the object applied to the weighing pan 21 can be transferred to the first weight sensor 261 and the second weight sensor 262. The analog signals (e.g., voltage signals or current signals) corresponding to the pressing force are generated by the first weight sensor 261 and the second weight sensor 262. After the analog signals are filtered by a low pass filter and amplified by an amplifier, the analog signals are converted into digital signals by an analog/digital converter (not shown). Then, the digital signal is transmitted to the processing unit 24. The digital signal will be further processed for application. Of course, the electronic scale 200 further comprises the required circuitry structure and the mechanism of a strain gauge. The required circuitry structure and the strain gauge are known in the art, and are not redundantly described herein.

Figure 3:
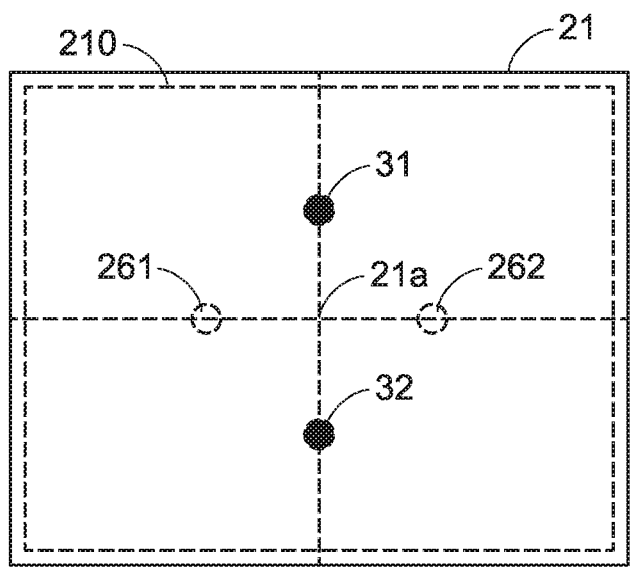
FIG. 3 is a schematic top view illustrating the weighing pan of the electronic scale according to the embodiment of the present invention.

FIG. 3 is a schematic top view illustrating the weighing pan of the electronic scale according to the embodiment of the present invention. As shown in FIG. 3, the weighing pan 21 has a placement region 210. When the object is placed in the range of the placement region 210, the weight of the object can be effectively measured. The first weight sensor 261 and the second weight sensor 262, which are indicated by dotted circles, are located under the weighing pan 21. Consequently, the pressing force applied to the weighing pan 21 can be sensed by the first weight sensor 261 and the second weight sensor 262. In this embodiment, the first weight sensor 261 and the second weight sensor 262 have the same weight-sensing specification. That is, the first weight sensor 261 and the second weight sensor 262 have the same model number and the same sensitivity.

In accordance with a feature of the present invention, the first weight sensor 261 and the second weight sensor 262 are symmetrically arranged in the placement region 210. As shown in FIG. 3, the first weight sensor 261 and the second weight sensor 262 are arranged beside two opposite sides of a center point 21a of the placement region 210. In addition, the distance between the first weight sensor 261 and the center point 21a and the distance between the second weight sensor 262 and the center point 21a are equal. That is, the first weight sensor 261 and the second weight sensor 262 have bilateral symmetry along the left/right direction or the horizontal direction. The symmetric arrangement of the two weight sensors 261 and 262 is related to the calibrating method of the present invention. The electronic scale calibrating method of the present invention is based on a linear adjustment. Especially, the electronic scale calibrating method is a calibrating method using two weight sensors.

As shown in FIG. 3, two standard samples 31 and 32 are further placed in the placement region 210. In this embodiment, the two standard samples 31 and 32 are employed during the calibration stage. For example, the two standard samples 31 and 32 are standard weights with the known weight values or any other appropriate objects with the known weight values. In accordance with another feature of implementing the electronic scale calibrating method, the two standard samples 31 and 32 have the same reference weight values. For example, both of the two standard samples 31 and 32 are 100 g-standard weights or 200 g-standard weights.

In an embodiment, the electronic scale calibrating method is executed through a firmware component that is installed in the electronic scale 200. Alternatively, the electronic scale calibrating method is executed through a calibration program that is stored in a flash memory (not shown) of the electronic scale 200. Moreover, the user may operate the operation interface 22 (e.g., press down or lengthily press down a specified button of the operation interface 22) to power on the electronic scale 200, zero the electronic scale 200 or enable the calibration function of the electronic scale 200. Consequently, the firmware or the calibration program is executed to start the calibrating process. The electronic scale calibrating method will be described in more details as follows.

Figure 4:
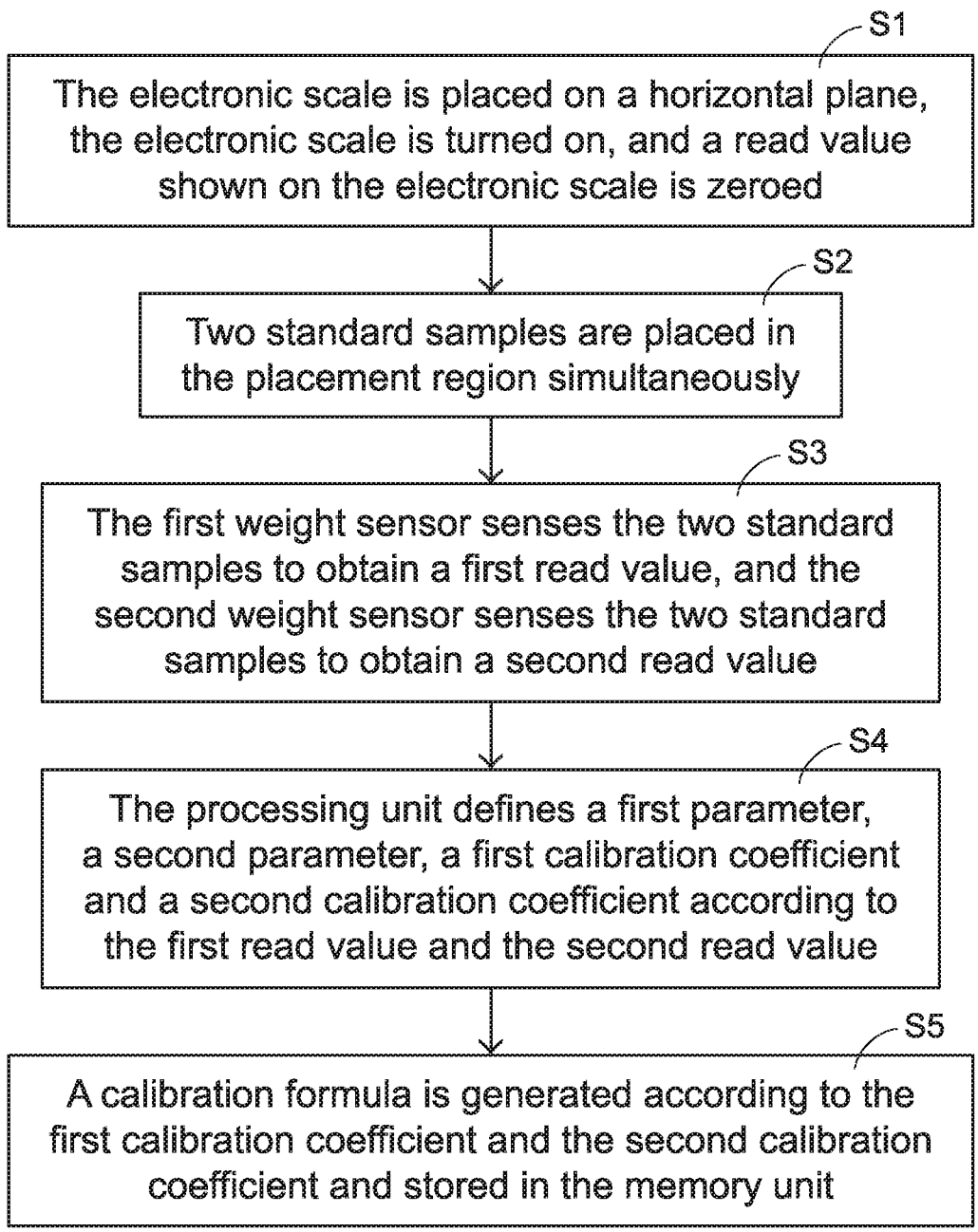
FIG. 4 is a flowchart illustrating an electronic scale calibrating method according to an embodiment of the present invention.

FIG. 4 is a flowchart illustrating an electronic scale calibrating method according to an embodiment of the present invention. Firstly, the electronic scale 200 is placed on a horizontal plane, the electronic scale 200 is turned on, and a read value shown on the electronic scale 200 is zeroed (Step S1). Then, the two standard samples 31 and 32 are placed in the placement region 210 simultaneously (Step S2). Then, in a step S3, the first weight sensor 261 senses the two standard samples 31 and 32 to obtain a first read value, and the second weight sensor 262 senses the two standard samples 31 and 32 to obtain a second read value. Then, the processing unit 24 defines a first parameter, a second parameter, a first calibration coefficient and a second calibration coefficient according to the first read value and the second read value (Step S4). Then, a calibration formula is generated by the processing unit 24 according to the first calibration coefficient and the second calibration coefficient, and the calibration formula is stored in the memory unit 25 (Step S5).

In the step S1, the electronic scale 200 to be calibrated is placed on a horizontal plane. Consequently, the weighing pan 21 is not inclined, and the sensing functions of the weight sensors 261 and 262 are not adversely affected. After the user operates the operation interface 22 to zero the electronic scale 200, the read value shown on the display interface 23 is zero. Then, a reference weight value corresponding to the standard samples 31 and 32 is inputted into the electronic scale 200 through the operation interface 22, and the weight values of the standard samples 31 and 32 are recorded for the subsequent calculation. Moreover, the user can view the input values through the display interface 23. For example, in case that both of the two standard samples 31 and 32 are 100 g-standard weights, the inputted reference weight value is 100.

In the step S2, the two standard samples 31 and 32 are placed simultaneously, and the two standard samples 31 and 32 are measured by the first weight sensor 261 and the second weight sensor 262 simultaneously. For enhancing the measuring efficacy, the two standard samples 31 and 32 are placed in the placement region 210, and the two standard samples 31 and 32 are symmetric with respect to the placement region 210 or symmetric with respect to the first weight sensor 261 and the second weight sensor 262. In the embodiment of FIG. 3, the two standard samples 31 and 32 are symmetric with respect to the placement region 210 and symmetric with respect to the first weight sensor 261 and the second weight sensor 262. That is, the two standard samples 31 and 32 are arranged beside two opposite sides of the center point 21a of the placement region 210. In addition, the distance between the standard sample 31 and the center point 21a and the distance between the standard sample 32 and the center point 21a are equal, the distance between the standard sample 31 and the first weight sensor 261 and the distance between the standard sample 31 and the second weight sensor 262 are equal, and the distance between the standard sample 32 and the first weight sensor 261 and the distance between the standard sample 32 and the second weight sensor 262 are equal.

It is noted that the way of placing the two standard samples 31 and 32 is not restricted or the two standard samples 31 and 32 may be placed at arbitrary positions of the placement region 210. For example, the two standard samples 31 and 32 are placed over the first weight sensor 261 and the second weight sensor 262, respectively. Alternatively, the positions of the two standard samples 31 and 32 are not symmetrical. Preferably, the positions of the two standard samples 31 and 32 are symmetrical. Due to the symmetrical arrangement of the two standard samples 31 and 32, the toque on the weighing pan 21 is not very large and the inclining condition of the weighing pan 21 influencing the measurement is not generated.

In the step S3, the first read value obtained by the first weight sensor 261 plus the second read value obtained by the second weight sensor 262 indicates the total weight value of the two standard samples 31 and 32. In case that the electronic scale is equipped with two weight sensors, the weight value of the object to be weighed is averagely distributed to the two weight sensors. That is, the sum of the measurement results of the two weight sensors indicates the weight value of the object to be weighed. In case that the position of the object to be weighed is different or the positions of the weight sensors are different, the measurement results of the two weight sensors are different.

After the first read value and the second read value are generated, the first read value and the second read value are transmitted to the processing unit 24 in order to be further processed. Alternatively, the first read value and the second read value are recorded into a dynamic random access memory (not shown) and then accessed by the processing unit 24. In this embodiment, the read value shown on the display interface 23 is the sum of the first read value and the second read value. The first read value and the second read value are not shown on the display interface 23. It is noted that numerous modifications and alterations may be made while retaining the teachings of the invention. For example, in another embodiment, the first read value, the second read value and the sum of the first read value and the second read value are simultaneously shown on the display interface 23.

In the step S4, the processing unit 24 defines the associated parameters and the associated calibration coefficients according to the calculation on the known reference weight value, the first read value and the second read value. In an embodiment, the first parameter, the second parameter, the first calibration coefficient and the second calibration coefficient have the following definitions. After the first read value is divided by the reference weight value, the first parameter is obtained. After the second read value is divided by the reference weight value, the second parameter is obtained. The first calibration coefficient is a reciprocal of the first parameter. The second calibration coefficient is a reciprocal of the second parameter.

In the step S5, the calibration formula is obtained according to the first calibration coefficient and the second calibration coefficient. In an embodiment, the product of a third read value and the first calibration coefficient plus the product of a fourth read value and the second calibration coefficient is equal to the calibration formula. When an object to be weight (not shown) is placed in the placement region 210, the first weight sensor 261 senses the object to obtain the third read value and the second weight sensor 262 senses the object to obtain the fourth read value.

Particularly, the first calibration coefficient and the second calibration coefficient are weighing coefficients of the electronic scale 200. In some situations, the measurement result of the electronic scale 200 is not accurate. Since the measurement result is properly corrected (especially through the linear adjustment) according to the calibrating method of the present invention, the finally displayed result is close to the real value. After the calibration formula is stored in the memory unit 25 by the processing unit 24, the electronic scale calibrating method is completed. In addition, the calibration formula is used for the subsequent weighing measurement. For example, the object to be weighed can be measured according to the calibration formula. The weight value of the object may be known or unknown.

For realizing the calibration result, the following steps are performed. Firstly, the two standard samples 31 and 32 are removed. Then, an object to be weighed (not shown) is placed in the placement region 210. After the object to be weighed is sensed by the first weight sensor 261, the third read value is obtained. After the object to be weighed is sensed by the second weight sensor 262, the fourth read value is obtained. Then, the third read value and the fourth read value are substituted into the calibration formula by the processing unit 24. Consequently, a calibrated weight value of the object is obtained. Afterwards, the calibrated weight value of the object is shown on the display interface 23.

In case that the weight value of the object is not calibrated according to the calibration formula, the sum of the third read value obtained by the first weight sensor 261 and the fourth read value obtained by the second weight sensor 262 is equal to the uncalibrated weight value of the object. In accordance with the present invention, the calibrated weight value of the object is obtained after the third read value and the fourth read value are processed according to the calibration formula.

Similarly, after the third read value and the fourth read value are generated, the third read value and the fourth read value are transmitted to the processing unit 24 in order to be further processed. Alternatively, the third read value and the fourth read value are recorded into a dynamic random access memory (not shown) and then accessed by the processing unit 24. In an embodiment, the third read value and the fourth read value are not shown on the display interface 23. In another embodiment, the third read value and the fourth read value are simultaneously shown on the display interface 23.

In an embodiment, the calibration formula is calculated according to the following mathematic formulae:

$$A1 = X1/W1 \quad (1)$$

$$A2 = X2/W1 \quad (2)$$

$$C1 = 1/A1 \quad (3)$$

$$C2 = 1/A2 \quad (4)$$

$$Y = X3 \times C1 + X4 \times C2 \quad (5)$$

In the above mathematic formulae, W1 is the reference weight value, X1 is the first read value, X2 is the second read value, A1 is the first parameter, A2 is the second parameter, C1 is the first calibration coefficient, C2 is the second calibration coefficient, X3 is the third read value, X4 is the fourth read value, and Y is the calibrated weight value. That is, the formula (5) is the calibration formula.

For example, W1 is 100, X1 is 105 and X2 is 98. Consequently, C1 is 1/1.05, and C2 is 1/0.98. After an object with an actual weight value of 100 (gram) is placed in the placement region, the third read value X3 and the fourth read value X4 are obtained. For example, X3 is 55, and X4 is 48. According to the calibration formula, the calibrated weight value Y of the object is about 101.36 (gram), i.e., Y=55/1.05+48/0.98=101.36.

In case that the calibrating method is not performed, the read weight value of the object is 103 (gram), i.e., 55+48=103. In case that the calibrating method of the present invention is performed, the calibrated weight value Y of the object is about 101.36 (gram). That is, the error is reduced after the calibrating method of the present invention is performed. Consequently, the linear adjustment of the calibrating method of the present invention is capable of effectively increasing the measurement accuracy of the electronic scale, and the calibrated weight value is close to the real weight value.

In accordance with the adjusting features of the present invention, the first calibration coefficient and the second calibration coefficient are appropriate 1. Consequently, the computing complexity is reduced. Moreover, the read value of the weight sensor is slightly higher or lower than the real value because of the mechanical problem. In accordance with the present invention, the read value higher than the real value is multiplied by the calibration coefficient lower than 1, and the read value lower than the real value is multiplied by the calibration coefficient higher than 1. Consequently, the calibrating method of the present invention provides the compensating efficacy similar to the interpolation method. The above example is presented herein for purpose of illustration and description only.

In case that both of the first calibration coefficient and the second calibration coefficient are 1, the calibrated weight value is equal to the sum of the third read value and the fourth read value, regardless of whether the calibration formula is utilized. It means that the measurement result of the electronic scale is accurate and the calibration is not necessary. After undue experiments and analytical operations, it is found that the linear adjustment of the present invention can provide the required calibration result.

In the above embodiment, the first weight sensor 261 and the second weight sensor 262 have the same weight-sensing specification. It is noted that numerous modifications and alterations may be made while retaining the teachings of the invention. For example, in another embodiment, the first weight sensor and the second weight sensor have different weight-sensing specifications. Preferably, the weight-sensing specification of one weight sensor is several times the weight-sensing specification of the other weight sensor. For example, the weight-sensing specification of the first weight sensor is 10 kilogram, and the weight-sensing specification of the second weight sensor is 1 kilogram. Under this circumstance, the sensitivity range is increased, and the measurement result is more accurate.

The above embodiment may be further modified. In the above embodiment, the read values or the display results are shown on the display interface 23. Alternatively, the read values or the display results are transmitted to and shown on any other appropriate electronic device with the displaying function. In this case, the electronic scale is equipped with a transmission interface, and the transmission interface is in communication with a computer or a smart phone in a wired transmission manner or a wireless transmission manner. Consequently, the read values or the display results can be shown on the computer or the smart phone.

From the above descriptions, the present invention provides an electronic scale with a calibration function and an electronic scale calibrating method. The technologies of the present invention are effective to overcome the drawbacks of the conventional electronic scale calibrating method. That is, the electronic scale calibrating method of the present invention is simplified, more efficient and time-saving. Consequently, the operating cost is reduced. According to the calibrating method of the present invention, two standard samples (or standard weights) with the same weight value are simultaneously placed on the weighing pan through a single placement step, and the complicated computing process is not required. In other words, the calibrating task is time-saving and labor-saving. Moreover, since the number of steps for calibrating the electronic scale is decreased, the electronic scale calibrating method of the present invention is suitable for manual calibration. In addition, the electronic scale calibrating method of the present invention provides a good development basis for the automatic calibrating technology such as the automatic equipment or the human intelligence technology.

In other words, the technologies of the present invention can overcome the drawbacks of the conventional technologies while achieving the objects of the present invention.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. An electronic scale calibrating method for an electronic scale, the electronic scale comprising a weighing pan, a memory unit, a first weight sensor and a second weight sensor, the weighing pan having a placement region, the first weight sensor and the second weight sensor being symmetric with respect to the placement region, the electronic scale calibrating method comprising steps of:
    placing two standard samples in the placement region simultaneously, wherein the two standard samples have the same reference weight value;
    sensing the two standard samples by the first weight sensor and the second weight sensor, wherein the first weight sensor senses the two standard samples to obtain a first read value, and the second weight sensor senses the two standard samples to obtain a second read value;
    dividing the first read value by the reference weight value so as to define a first parameter;
    dividing the second read value by the reference weight value so as to define a second parameter;
    defining a reciprocal of the first parameter as a first calibration coefficient;
    defining a reciprocal of the second parameter as a second calibration coefficient; and
    generating a calibration formula according to the first calibration coefficient and the second calibration coefficient, and storing the calibration formula in the memory unit,
    wherein the product of a third read value and the first calibration coefficient plus the product of a fourth read value and the second calibration coefficient is equal to the calibration formula, wherein when an object to be weight is placed on the weighing pan, the first weight sensor senses the object to obtain the third read value and the second weight sensor senses the object to obtain the fourth read value.

2. The electronic scale calibrating method according to claim 1, wherein the electronic scale calibrating method is executed through a firmware component that is installed in the electronic scale, or the electronic scale calibrating method is executed through a calibration program that is stored in a flash memory of the electronic scale.

3. The electronic scale calibrating method according to claim 1, further comprising steps of placing the electronic scale on a horizontal plane, turning on the electronic scale, and zeroing the electronic scale.

4. The electronic scale calibrating method according to claim 1, wherein when the two standard samples are placed in the placement region, the two standard samples are symmetric with respect to the placement region, or the two standard samples are symmetric with respect to the first weight sensor and the second weight sensor.

5. The electronic scale calibrating method according to claim 1, further comprising steps of:
    removing the two standard samples;
    placing the object in the placement region; and
    substituting the third read value and the fourth read value into the calibration formula, so that a calibrated weight value of the object is obtained.

6. An electronic scale with a calibration function, the electronic scale comprising:
    a weighing pan having a placement region, wherein two standard samples having the same reference weight value are placed in the placement region;
    a first weight sensor sensing the two standard samples to obtain a first read value;
    a second weight sensor sensing the two standard samples to obtain a second read value, wherein the first weight sensor and the second weight sensor are symmetrically arranged in the placement region;
    a processing unit for dividing the first read value by the reference weight value to define a first parameter, dividing the second read value by the reference weight value to define a second parameter, defining a reciprocal of the first parameter as a first calibration coefficient, defining a reciprocal of the second parameter as a second calibration coefficient and generating a calibration formula according to the first calibration coefficient and the second calibration coefficient; and a memory unit storing the calibration formula, wherein the product of a third read value and the first calibration coefficient plus the product of a fourth read value and the second calibration coefficient is equal to the calibration formula, wherein when an object to be weight is placed on the weighing pan, the first weight sensor senses the object to obtain the third read value and the second weight sensor senses the object to obtain the fourth read value.

7. The electronic scale according to claim 6, wherein when the two standard samples are placed in the placement region, the two standard samples are symmetric with respect to the placement region, or the two standard samples are symmetric with respect to the first weight sensor and the second weight sensor.

8. The electronic scale according to claim 6, wherein after the third read value and the fourth read value are substituted into the calibration formula by the processing unit, a calibrated weight value of the object is obtained.

9. The electronic scale according to claim 6, further comprising:

an operation interface, wherein through the operation interface, the electronic scale is powered on, the electronic scale is zeroed or the calibration function is enabled; and a display interface, wherein the calibrated weight value is shown on the display interface.

10. The electronic scale according to claim 6, wherein a weight-sensing specification of the first weight sensor and a weight-sensing specification of the second weight sensor are identical or different.

* * * * *